Oct. 15, 1968 R. L. BAILLY 3,406,234
MOLDING PROCESS
Filed Jan. 17, 1966
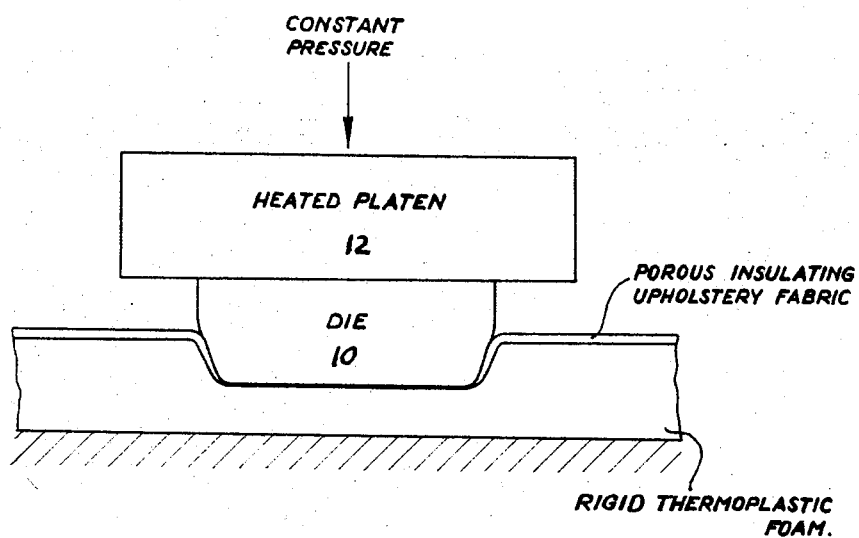
INVENTOR.
RICHARD L. BAILLY : # 3,406,234
MOLDING PROCESS
Richard L. Bailly, Woodcrest Road,
Boxford, Mass. 01921
Filed Jan. 17, 1966, Ser. No. 521,127
1 Claim. (Cl. 264—257)

ABSTRACT OF THE DISCLOSURE

A cavity-contoured upholstered packaging panel is formed by covering a board of rigid thermoplastic foam with an insulating upholstery fabric, and applying a heated die defining the cavity to the fabric and board. The die is heated sufficiently to soften the thermoplastic material and penetrate into the board at a rate of at least about 1½ inches per minute while under a pressure of about 1.8 pounds per square inch.

---

This invention relates to the manufacture of contoured upholstered packaging panels, that is to say, board-like blocks designed to fit within a package box to receive and hold the merchandise in closely fitting depressions and having a covering of soft fabric or other decorative material. Panels of this type are commonly used in the packaging of cameras and similar items.

Cavity contoured upholstered packaging panels can readily be made by forming a cavity in a block of base-stock material, and then applying the upholstery material and cementing it in place. It has now been found, however, that by making use of certain materials and forming operations a much simpler process can be utilized whereby the base-stock material is formed and the upholstery fabric bonded thereto in a single operation.

In general, the invention utilizes a thermoplastic rigid foam material of relatively low melting point as the base-stock and a porous upholstery fabric capable of withstanding a temperature well above the melting point of the thermoplastic. The upholstery fabric is laid upon the surface of the base-stock and a heated die, which corresponds to the cavity to be formed, is pressed against the fabric into the base-stock simultaneously to form the cavity and to fuse the base-stock sufficiently to adhere to the upholstery fabric.

It has been found that the success of the molding and upholstery operation requires rather close and critical control of the temperature of the die which must be about 180° F. or more hotter than the melting point of the thermoplastic material, by an amount depending on the insulating effect of the upholstery fabric. In general, the die must be sufficiently hot not only to permit the die to be pressed into the thermoplastic base, but further to be pressed in at a sufficiently high rate under a controlled low pressure that cumulative heating effects are avoided which would cause overmelting of the top and side walls and consequent distortion of the cavity.

In the preferred embodiment of the invention the thermoplastic base material will be expanded polystyrene foam having a melting point of about 160°–180° F. and a density of about one half pound per cubic foot (commercially designated Type 20). With a sheet of open foam polyurethane as the upholstery fabric (both the ether and ester types are suitable) e.g. that commercially available from General Foam Corp., the die should be heated to about 390° F. and pressed into the combination, under a constant pressure of about 1.8 lbs. per square inch and at a rate of about 1½ inches per minute. When the penetration has been completed, the die is removed and it will be found that the polyurethane upholstery accurately conforms to the cavity, and is bonded to the bottom of it through the melting of the polystyrene. The upholstery is otherwise unaffected by the operation.

When the die was heated to only 375° F., the cavity was found to be overly melted at the top, and also indefinite and uneven with more melting at the top edges than along the side walls.

Other thermoplastic foam materials that may be used include polystyrene foams of higher density, e.g. one pound per cubic foot and 1.8 pounds per cubic foot and also polyethylene foam, of a density of about 2.0 lbs. per cubic foot, and other upholstery materials that may be used are cotton, satin brocade, velveteen and wool.

In the table below the preferred operating temperatures are set forth for the various types of material combinations, it being noted in general that lower temperatures are required when the upholstery material has a lower insulation value.

Table I

| Polystyrene foam and: | Temp., ° F. |
|---|---|
| Cotton | 340 |
| Satin brocade | 355 |
| Wool | 380 |
| Polyurethane, ⅛″ thick | 390 |
| Polyethylene foam and: | |
| Cotton | 355 |
| Velveteen | 365 |
| Brocade | 365 |
| Wool | 380 |
| Polyurethane, ⅛″ thick | 390 |

It has not been possible to formulate any general rule as to the requisite temperature other than by reference to the results to be achieved. It is somewhat paradoxical that overmelting of the base material is avoided by bringing the die to a relatively high temperature so that it may be caused to penetrate rapidly, and that overmelting occurs when the die is not hot enough. The temperature is accordingly specified as that sufficient to permit penetration of the die into the upholstery fabric covered thermoplastic backing preferably at a rate of about 1½ inches per minute under a pressure of about 1.8 lbs. per square inch.

The process is illustrated schematically in the accompanying drawing.

The die 10 is mounted to a heated platen 12, which is part of a press (not shown) controllable to lower the platen and die at a constant pressure. The die 10 it will be noted is preferably formed with rounded edges so as to avoid cutting into the upholstery fabric.

Although this invention has been described in detail with reference to its preferred embodiments, it is contemplated that modifications will readily occur to those skilled in the art and familiar with the principles herein set forth, and that such modifications may be made without departing from the scope of this invention.

Having thus disclosed my invention, I claim and desire to secure by Letters Patent:

1. The method of making a cavity contoured upholstered packaging panel comprising covering a board of rigid thermoplastic foam material selected from the group consisting of polystyrene and polyethylene, with an insulating porous upholstery fabric stable at 390° F., applying a heated die defining said cavity to said fabric and board, said die being sufficiently hot to soften the thermoplastic material under molding pressure and penetrate into said board at a rate of at least about 1½ inches per minute without degrading said fabric, and pressing said die into said fabric and board under a pressure of about 1.8 lbs. per square inch to form said cavity and cause said board to melt sufficiently to bond said fabric.

References Cited

UNITED STATES PATENTS 2,341,979  2/1944  Cunnington -------- 264—45 X
2,397,743  4/1946  Kaphan ---------- 264—284 X ROBERT F. WHITE, *Primary Examiner.*

K. J. HOVET, *Assistant Examiner.*